United States Patent [19]

Wilkinson

[11] Patent Number: 4,825,323

[45] Date of Patent: Apr. 25, 1989

[54] OUT-OF-STEP BLOCKING UNIT

[75] Inventor: Stanley B. Wilkinson, Havertown, Pa.

[73] Assignee: General Electric Company, King of Prussia, Pa.

[21] Appl. No.: 120,149

[22] Filed: Nov. 12, 1987

[51] Int. Cl.$^4$ .............................................. H02H 3/00
[52] U.S. Cl. ........................................ 361/65; 261/67; 261/76; 261/81; 261/85
[58] Field of Search ........................ 261/62, 63, 65, 67, 261/76, 78, 79, 80, 85

[56] References Cited

U.S. PATENT DOCUMENTS

| | | | |
|---|---|---|---|
| 3,992,651 | 11/1976 | Hodges | 361/77 X |
| 4,254,444 | 3/1981 | Eriksson et al. | 261/82 |
| 4,342,062 | 7/1982 | Hodges | 361/77 X |
| 4,420,788 | 12/1983 | Wilkinson et al. | 361/80 X |
| 4,433,353 | 2/1984 | Wilkinson | 361/81 X |
| 4,453,191 | 6/1984 | Wilkinson | 361/84 |
| 4,686,601 | 8/1987 | Alexander et al. | 361/76 X |

*Primary Examiner*—Derek S. Jennings
*Attorney, Agent, or Firm*—Henry J. Policinski; William H. Murray

[57] ABSTRACT

An out-of-step blocking unit of a protective relay for detecting faults in a three phase alternating current electrical power distribution system utilizes restraint signals in conjunction with an operating signal to generate a net operate signal as a restraint to the relay in order to prevent operation of circuit breakers associated with the relay as a result of load swings in the power distribution system. The restraint signals include a signal related to a negative sequence component of current flowing in the distribution system; a signal related to a zero sequence component of current flowing in the power distribution system; and a signal related to a $\Delta$ (IZ-V) quantity which is the difference between fault and pre-fault values of the quantity (IZ-V).

9 Claims, 4 Drawing Sheets

_Fig. 1_

_Fig. 2_

Fig. 5

OUT-OF-STEP BLOCKING UNIT

BACKGROUND OF THE INVENTION

The present invention relates to relay systems for use in protecting AC power distribution systems and more particularly to out-of-step blocking units for preventing circuit breaker operation as a result of load swings.

Sometimes, as a result of anomalous operation of the power system, for example when the system is not operating in synchronization, the impedance characteristics will change and, in some cases, change to the extent that the protective relay system treats such a change as a fault condition thereby generating a trip signal to the circuit breaker protecting the line. Since it may be undesirable to trip the circuit breakers under these conditions, out-of-step blocking units have been incorporated into protective relay systems to provide a blocking signal which prevents circuit breaker tripping as a result of load swings.

Figure 1:
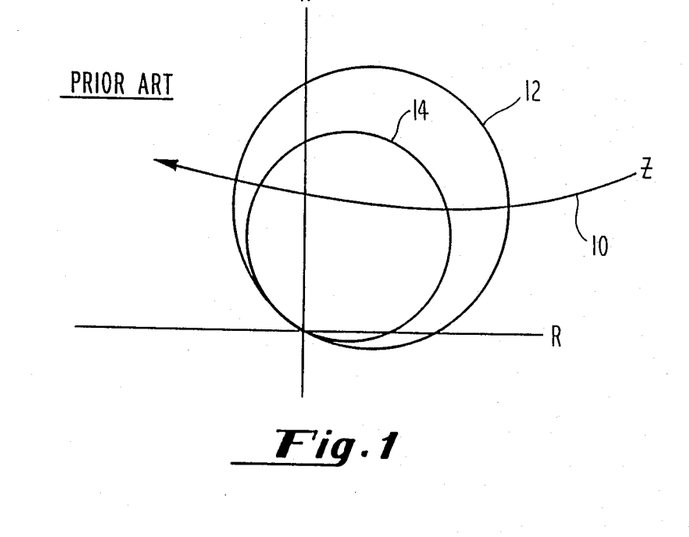
FIG. 1 is an R-X diagram depicting characteristics of overreaching and first zone relays in a protective relaying system for AC power transmission lines.

Load swing conditions can be visualized by referring to the R-X diagram shown in FIG. 1. The path of the impedance point Z caused by a load swing is represented by the line 10. As can be seen, the path of the impedence point enters the characteristic of an overreaching relay, represented by circle 12, as well as the characteristic of a first zone relay, represented by the circle 14. As is known in the art of protective relaying, once the load impedance comes within the characteristic of a protective relay, the relay will generate a trip signal. For the condition depicted in FIG. 1, the overreaching relay will generate a trip signal once the load point comes within its characteristic 12; and the first zone relay will generate a trip signal once the load point enters its characteristic 14.

Figure 2:
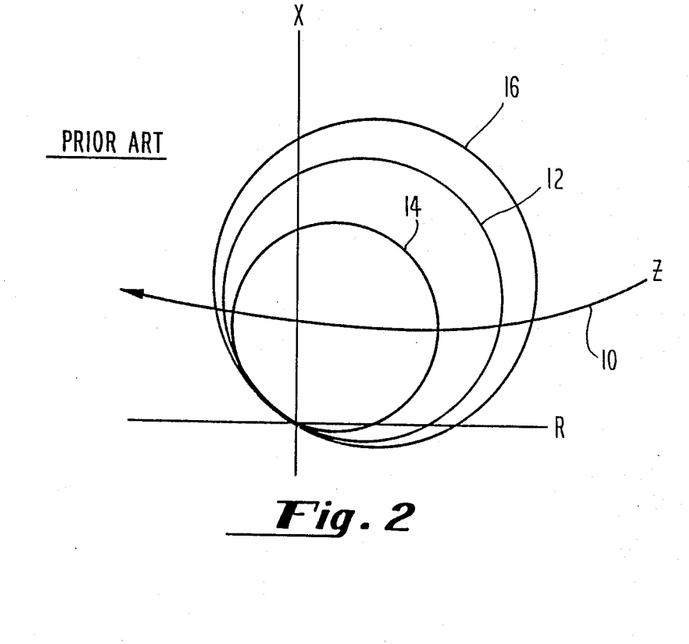
FIG. 2 is a R-X diagram depicting characteristics of out-of-step blocking, overreaching and first zone relays in a protective relaying system for an AC power transmission line.

As indicated above, it is undesirable that the circuit breakers trip on an impedance change caused by a load swing. Consequently, it is desirable to be able to discriminate between a load swing and a fault condition. This has been accomplished by adding an out-of-step blocking unit, which is essentially an overreaching relay, to the system. Referring to FIG. 2, there is shown a R-X diagram on which is depicted the characteristic of the out-of-step blocking unit, represented by circle 16, as well as the characteristics of the overreaching relay, represented by the circle 12 and the first zone relay, represented by the circle 14.

It has been found that a change in impedance due to a swing causes the impedance to change at a rate which is slower than that which occurs as the result of a fault. As a result, load swings, for which tripping is not desired, are detected by measuring the time from which the impedance enters the characteristic of the out-of-step blocking relay, circle 16 in FIG. 2, and the time the impedance comes within the characteristic of the overreaching relay, circle 12 in FIG. 2, or the first zone relay, circle 14 in FIG. 2. If this time difference exceeds a predetermined limit, the system treats the change in impedance as a load swing and therefore causes the out-of-step blocking unit to generate a blocking signal thereby preventing the tripping of the circuit breakers.

One problem with prior out-of-step blocking units is that they can generate blocking signals under certain fault conditions in which tripping should be allowed to occur. For instance, a high resistance ground fault may cause the impedance seen by a relay at one end of the protected line to fall between the tripping characteristic and the out-of-step blocking characteristic, thus causing the out-of-step circuit to block tripping. This adversely affects the reliability of the system by preventing the operation of the circuit breakers when they should be tripped to isolate a fault.

Another problem experienced in the past has been a lack of coordination between the out-of-step blocking unit and the tripping units on internal faults. In some instances, the blocking unit will operate prematurely with respect to the tripping units once again causing circuit breaker operation to be erroneously blocked.

Accordingly, it is an object of the present invention to provide a protective relay system for protecting AC power transmission lines incorporating an out-of-step blocking unit, which system has enhanced reliability.

It is another object of the present invention to provide a protective relay system for an AC power transmission line in which the coordination of the out-of-step blocking unit and the tripping units is enhanced.

It is still another object of the present invention to provide a protective relay system for an AC power transmission line in which coordination between blocking units and tripping units is enhanced by preventing or substantially delaying the operation of the out-of-step blocking unit on internal faults.

These and other objects of the present invention will become apparent to those skilled in the art upon consideration of the following description of the invention.

SUMMARY OF THE INVENTION

The present invention comprises an out-of-step blocking unit for use in a protective relaying system for an AC power transmission line in which addition of restraining signals are utilized to ensure coordination of the out-of-step blocking unit and tripping units of the protective relay system upon occurrence of internal faults. The added restraint signals are preferably the negative sequence and zero sequence components of the current as well as a $\Delta(IZ-V)$ quantity which is the difference in the $(IZ-V)$ quantity between the post fault and pre-fault values; in other words, $\Delta(IZ-V)$ is in effect the change in the $(IZ-V)$ quantity due to the fault.

The addition of these restraint signals simplifies the application since the timer in the out-of-step blocking logic, which in the past has been the only setting which discriminates between a swing and a fault, may now be set without a rigorous determination of the impedence-time characteristic of the swing locus while assuring that the fastest swing will be detected. Except for series compensated line applications, the setting can be determined knowing only the impedance of the protected line section. Absolute values of equivalent source impedance or source/line impedance ratios, the knowledge of which was necessary in the past, are no longer required.

DETAILED DESCRIPTION OF THE PREFERRED EMBODIMENT

Figure 3:
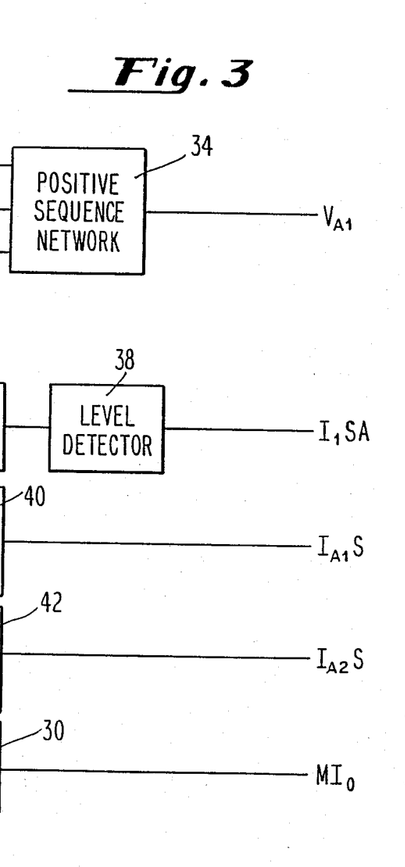
FIG. 3 is a one line, block diagram of a current and voltage processing portion of the preferred embodiment of the out-of-step blocking unit of the present invention.

Referring to FIG. 3, there is shown a one-line, block diagram of a preferred embodiment of the current and voltage processing portion of the out-of-step blocking unit of the present invention. A three phase alternating current electric power transmission line, generally designated 10, has an A phase (A), a B phase (B), a C phase (C) and ground (G). Each of the three phases have associated with it means 20 for sensing current in that particular phase as well as means 32 for sensing voltage on that phase. As is well known to those skilled in the protective relaying and power transmission art, current sensing means 20 may be a current transformer and voltage sensing means 32 may be a step down potential transformer. As shown in FIG. 1, a current sensing means is associated with each phase; means 20a being associated with phase A, means 20b being associated with phase B and means 20c being associated with phase C. Likewise, there is a separate voltage sensing means 32a associated with phase A, means 32b associated with phase B and means 32c associated with phase C. However, it is to be understood that although a specific type of current and voltage sensing scheme is depicted in FIG. 1, other schemes known in the art may be substituted for that depicted; the purpose being to obtain signals which are related to each phase voltage and each phase current.

The output from the current sensing means 20a is coupled to a first transactor 21a; the output from the current sensing means 20b is coupled to a second transactor 21b; and the output from the current sensing means 20c is coupled to a third transactor 21c. As is known in the art, the secondary voltage output of a transactor is related to the input current by a complex proportionality constant or a vector operator known as the transfer impedence of the transactor. For transactors 21a, 21b and 21c shown in FIG. 3, the transfer impedence of each is selected to be equal to a fixed transfer ratio and a fixed angle, for example 85°. Consequently, the output of transactor 21a is a signal $I_{AT}$ which has, for example, a fixed 85° phase shift with respect to the input $I_A$. The output signals $I_{BT}$ and $I_{CT}$ from transactors 21b and 21c respectively, are similarly related to their respective inputs $I_B$ and $I_C$. Further detailed descriptions of transactors may be had by reference to U.S. Pat. No. 3,374,399, issued to Dewey which patent is assigned to the assignee of the present invention and the teaching of which are incorporated by reference in this detailed description as if fully set forth herein.

The output of transactors 21a, 21b and 21c are coupled to the inputs of a first positive sequence network 22, a second positive sequence network 24, a negative sequence network 26, and a first three-input summing amplifier 28. The summing amplifier 28 produces an output signal having a magnitude which is equal to the sum of the magnitude of the signals applied to the inputs, multiplied by a predetermined gain which, in the preferred embodiment, is $-\frac{1}{3}$. Consequently, the output of the summing amplifier 16 is equal to $MI_O$ where $I_O$ is the zero sequence component of the phase current in the transmission line; and M indicates, in the convention used in this detailed description, that the signal is inverted. The output of the first three-input summing amplifier 28 is coupled to the input of a phase shift network 30. The output of the phase shift network 30 is the input signal which has been shifted in phase by a predetermined amount which, in the preferred embodiment, is 25° lagging. Consequently, the output of the phase shift network 30 is the signal $MI_OF$ where F, in the convention used herein, indicates that the signal has been phase shifted.

The output of voltage sensing means 32a is coupled to the primary of a first transformer 33a; the output of the voltage sensing means 32b is coupled to the primary of a second transformer 33b; and the output of the voltage sensing means 32c is coupled to the primary of a third transformer 33c. The signals from the secondaries of the transformers 33a, 33b and 33c are coupled to the inputs of a third positive sequence network 34. It is well understood to those skilled in the art of electrical power transmission protective relaying that phase currents in a three-phase alternating current circuit can be resolved into three sets of symmetrical, balanced voltage and current vectors known as positive sequence, negative sequence and zero sequence components. It is also well known that certain circuits called "symmetrical component networks" can be connected to a three-phase electrical power system to provide an output signal that is proportional to the magnitude of the selected one of the three sequence components of voltage or current. The negative 26 and postive 22, 24 and 34, sequence networks are such networks. Sequence networks of this type are disclosed in U.S. Pat. No. 4,342,062. Further detailed descriptions of symmetrical component networks can be had by reference to U.S. Pat. No. 3,992,651 issued to Hodges; and 4,034,269 issued to Wilkinson, both of which patents, as well as U.S. Pat. No. 4,342,062, are assigned to the assignee herein and the teachings of all are incorporated into this detailed description by reference as if fully set forth herein.

The output of the first positive sequence network 22 is a signal, $3I_{A1}$, representative of three times the positive sequence component $I_{A1}$ of the current flowing in A phase of the transmission line. The output of the second positive sequence network 24 is a signal, $I_{A1}$, representative of the positive sequence component of the current flowing in the A phase of the transmission line. The output of the negative sequence network 26 is a signal, $I_{A2}$, representative of the negative sequence component of the current flowing in the A phase of network 34 is a signal, $V_{A1}$, representative of the positive sequence component of the voltage in the A phase of the transmission line.

The output signal $3I_{A1}$ from the first positive sequence network 22 is coupled to a first AC couple circuit 36 which has a gain of approximately 1 for non-DC signals and zero for the DC component. The output of the AC couple circuit 36, which is the same as the input signal except that the DC component has been removed, is coupled to the input of a first level detector 38. The output of the first level detector 38 is a signal, $I_1SA$ which is generated when the magnitude of the input signal exceeds a predetermined value. In the preferred embodiment, the predetermined value is 0.05 per unit of rated current.

The output signal $I_{A1}$ from the second positive sequence network 24 is coupled to the input of a positive sequence angle adjust circuit 40. The output of the positive sequence angle adjust circuit 40 is a signal $I_{41}S$, which is equal to the input signal, $I_{41}$, having a preselected angle. In the preferred embodiment, the preselected angle is in the range of from approximately 70° to 85°. The S in the expression $I_{41}S$ indicates that, in the convention used herein, the positive sequence component of the phase A current has been adjusted to a predetermined angle. This phase shift is used to adjust the angle of the positive sequence replica impedance to match the angle of the protected line.

The output signal, $I_{42}$, from the negative sequence network 22 is coupled to the input of a negative sequence angle adjust circuit 42. The output of the negative sequence angle adjust circuit 42 is a signal, $I_{42}S$, which is equal to the input signal, $I_{42}$, having a preselected angle. In the preferred embodiment, the preselected angle is the range of from approximately 70° to 85°. This phase shift is used to adjust the angle of the negative sequence replica impedance to match the angle of the protected line.

Figure 4:
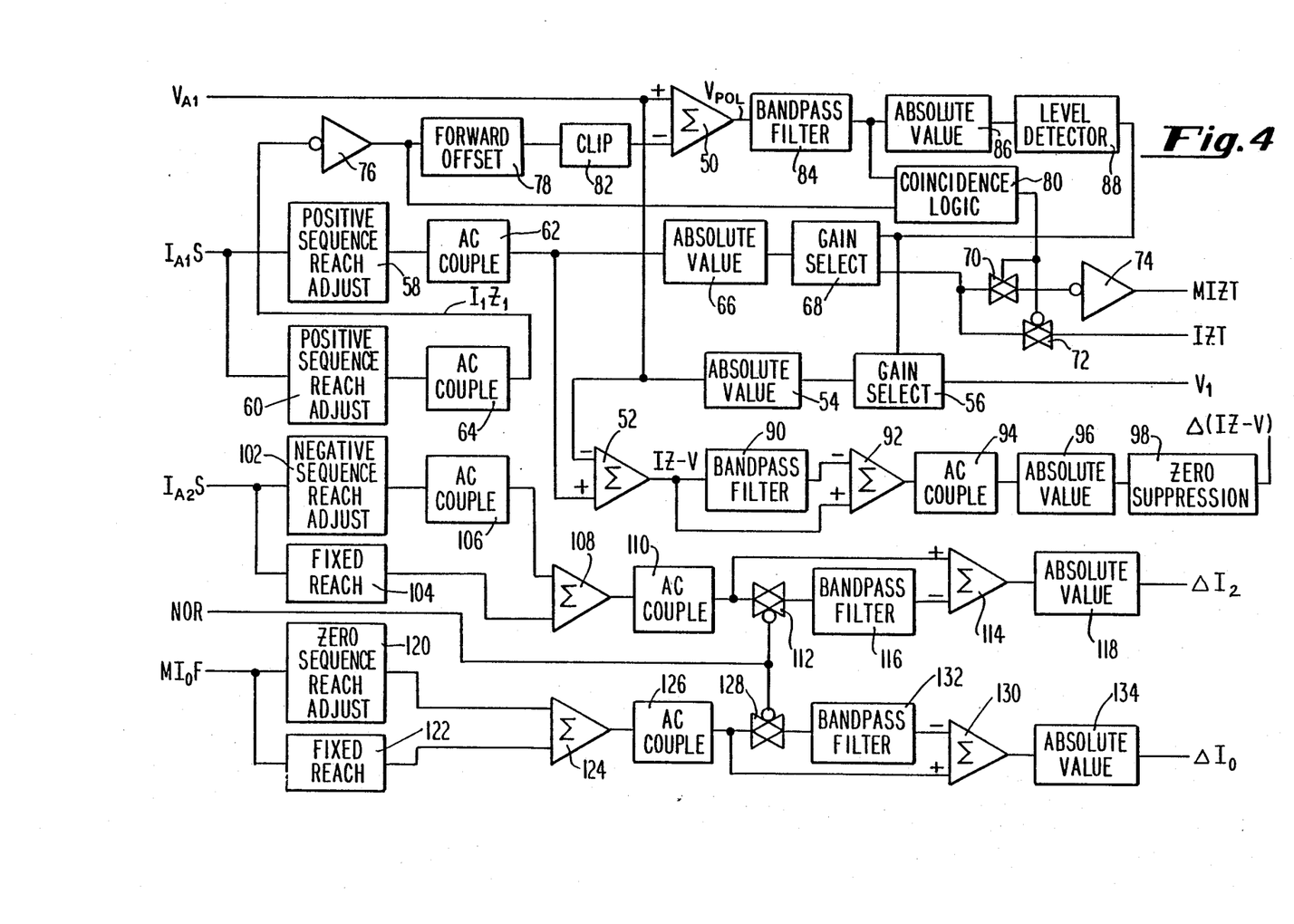
FIG. 4 is a block diagram of a reach adjustment and polarizing portion of the preferred embodiment of the out-of-step blocking unit of the present invention.

Referring now to FIG. 4, there is shown a preferred embodiment of the reach adjustment and polarizing portion of the out-of-step blocking unit of the present invention. The positive sequence component of the phase A voltage ($V_{A1}$), which has been obtained in accordance with the description set forth with respect to FIG. 3, is coupled to a non-inverting input of a first two-input summing amplifier 50, one input of a second two-input summing amplifier 52 and the input of a first absolute value circuit 54. In the preferred embodiment, the first 50 and second 52 two-input summing amplifiers each comprise an operational amplifier which generates an output signal having a magnitude which is equal to the algebraic sum of the magnitudes of the signals applied to the inverting and non-inverting inputs. The absolute value circuit 54 is preferably a full wave precision rectifier of the type shown and described on pages 206 and 207 of the publication entitled "IC Op-Amp Cookbook", Second Edition, W. G. Jung, Howard Sams & Co., Inc. which is incorporated in the detailed description by reference as if fully set forth herein.

The output of the first absolute value circuit 54, which is a signal having a magnitude which is substantially equal to the absolute value of the magnitude of the input signal, is coupled to the input of a first gain select circuit 56. The output of the first gain select circuit 56 is a signal, the magnitude of which is a function of gains which are selectable by "high" or "low" signals applied to a gain select input. In the preferred embodiment, the gain is either one, selectable by application of a "high" signal to the gain select input; or, a gain of 0.4, selectable by application of a "low" signal. Consequently, the magnitude of the output signal is either equal to the magnitude of the input signal or is equal to 0.4 times the magnitude of the input signal depending upon the state of the signal applied to the gain select control input.

The $I_{41}S$ signal, which was generated in accordance with the description set forth with respect to FIG. 3, is coupled to the input of a first positive sequence reach adjust circuit 58 and a second positive sequence reach adjust circuit 60. The first 58 and second 60 positive sequence reach adjust circuits are adjustable gain op amp circuits. The output of the first positive sequence reach adjust circuit 58, which has a magnitude set to be representative of the reach of the protective relay systems, is coupled to the input of a second AC couple circuit 62. The output of the second positive reach adjust circuit 60 is coupled to the input of a third AC couple circuit 64. In the preferred embodiment, the second 62 and third 64 AC couple circuits are the same type as the previously described first AC couple circuit 36.

The output of the second AC couple circuit, which is the same as the input signal except that any DC component has been removed is coupled to the input of a second absolute value circuit 66 and the other input of the second two-input summing amplifier 52. The output of the second absolute value circuit 66, which is a signal having a magnitude equal to the absolute value of the magnitude of the input signal, is coupled to a second gain select circuit 68. In the preferred embodiment, the second select circuit 68 is the same type as the previously described first gain select circuit 56. In the preferred embodiment, the second gain select circuit 68 also has a selectable gain of one when a "high" signal is applied to the gain select input and a gain of 0.4 when a "low" signal is applied to the gain select input.

The output of the second gain select circuit 68 is a signal which is coupled to the input of a first electronic switch 70 and a second electronic switch 72. The preferred embodiment, the electronic switches 70 and 72 are each controlled by a signal applied to a control input. Application of a control signal to the control input will operate the switch thereby connecting the signal applied to the input of the switch directly to its output. With respect to the first electronic switch 70, a "high" signal applied to the control input will connect the signal at the input of the switch to its output. With respect to the second electronic switch 72, a "low" signal applied to the control input will cause the signal appearing at the switch input to be connected to the switch output.

The output of the first electronic switch 70 is coupled to the input of a first inverter 74. The first inverter 74 is preferably an operational amplifier having an inverting input and which generates an output signal which is substantially equal to the inverted input signal. Consequently the output of the first inverter 74 is a signal MIZT which is the inverse of the output of the second gain select circuit 68 which is selectively coupled to the input of the first inverter 74 through the second electronic switch 70. The output of the second electronic switch 72 is the IZT signal.

The output I, Z, of the second AC couple circuit 64 is coupled to the input of a second inverter 76. The second inverter 76 is preferably the same type as the previously described first inverter 74, having an inverting input and generating an output signal which is substantially equal to the inverted input signal. The output of the second inverter 76 is coupled to the input of a forward offset circuit 78 and one input of a two-input coincidence logic circuit 80. In the preferred embodiment, the forward offset circuit 70 is a variable gain op amp circuit with a gain adjustable between 0.0 and 0.4 times the forward reach. The output of the forward offset circuit 78, which is proportional to the desired forward offset, is coupled to the input of a clip circuit 82.

In the preferred embodiment, the clip circuit 82 comprises a zero suppression circuit which passes that portion of the input signal which is greater than a pre-set level, and a differential amplifier which subtracts the output of the zero suppression network from the input signal. Consequently, the clipping network 52 passes only that portion of the input signal that is less than the pre-set level. In the preferred embodiment, the clip circuit 82 is of the type shown and described under the heading "BOUNDS" of a publication entitled "Nonlinear Circuits Handbook", edited by Daniel H. Sheingold, published 1974 by Analog Devices Inc., Norword, Mass, which publication is incorporated in this detailed description as if fully set forth herein. The output of the clip circuit 82, which is that portion of the input signal whose magnitude is less than the pre-set level, is coupled to an inverting input of the first two-input summing amplifier 50.

The output Vpol of the first two-input summing amplifier 50, which as previously stated is a signal whose magnitude is the algebraic sum of the magnitudes of the signals at the inverting and non-inverting inputs, is coupled to the input of a first band pass filter 84. In the preferred embodiment, the first band pass filter 84 is a multiple feeback band pass filter with a center frequency selected equal to the rated frequency of the power system, which is typically 50Hz or 60Hz. The first band pass filter 84 preferably has a Q approximately equal to 3.8 and a gain of $-1$. The output of the first band pass filter 84 is coupled to the input of a third absolute value circuit 86 and the second input of the two-input coincidence logic circuit 80. In the preferred embodiment, the third absolute value circuit 86 is the same type as the previously described first absolute value circuit 54.

The output of the third absolute value circuit 86, which is a signal whose magnitude is the absolute value of the magnitude of the input signal, is coupled to the input of a second level detector 88. The second level detector 88 is the same type as the previously described first level detector 38. The output of the second level detector 88, which is a signal generated when the input exceeds a predetermined level (0.35 per unit in the preferred embodiment), is coupled to the gain control inputs of the first 56 and second 68 gain select circuits. With no output from the second level detector 88, the magnitudes of the output signals from the first and second gain select networks will be equal to the magnitudes of their respective input signals multiplied by the low gain.

The output $(IZ-V)$ of the second two-input summing amplifier 52 is applied to the input of a second band pass filter 90 and the non-inverting input of a third two-input summing amplifier 92. In the preferred embodiment, the second band pass filter 90 is a multiple feedback band pass filter with a center frequency selected equal to the rated frequency of the power system, which is typically 50Hz or 60Hz. The second band pass filter 90 preferably has a Q approximately equal to 3.8 and a gain of one. With a Q of 3.8, a change in the input signal from the band pass filter 90 lags the corresponding chage to the input thereby providing a short term memory of the pre-change signal. Although a higher Q would provide a longer time constant and a longer term memory, it would create greater phase variation upon occurrence of a change in frequency, which could cause generation of a signal from the third two-input summing amplifier 92 to which the output of the second band pass filter 90 is coupled. Such a signal could create erroneous operation of the out-of-step blocking unit since it could be generated as a result of a expected variation in frequency and not as a result of a fault.

The output of the third two-input summing amplifier 92 is a signal $\Delta(IZ-V)$ having a magnitude which is the algebraic sum of the magnitude of the signals applied to the inverting and non-inverting inputs of the amplifier 92. Due to the short term memory of the band pass filter 90, as previously described, immediately following occurrence of a fault, the output signal $\Delta(IZ-V)$ from the amplifier 92 is initially equal to the post-fault magnitude of the quantity $(IZ-V)$ minus the prefault magnitude of that quantity.

The signal $\Delta(IZ-V)$ is coupled to the input of a fourth AC couple circuit 94. The fourth AC couple circuit 94 is the same type as the previously described first AC couple circuit 36. The output of the fourth AC couple circuit 94, which is the same as the input signal except that any DC component has been removed, is coupled to the input of a fourth absolute value circuit 96, which is the same type as the previously described first absolute value circuit 54. The output of the fourth absolute value circuit 96, which is a signal whose magnitude is the absolute value of the magnitude of the input signal, is coupled to the input of a zero suppression circuit 98.

In the preferred embodiment, the zero suppression circuit 98 comprises a circuit which removes that portion of the input signal that is less than a pre-set level. Consequently, the zero suppression circuit 98 passes only that portion of the input signal which is greater than the pre-set level. In the preferred embodiment, the zero suppression circuit 98 is of the type shown and described under the heading "DEAD ZONE" on page 25–26 of the aforementioned "Nonlinear Circuits Handbook" previously incorporated into this detailed description by reference, whose output is a signal $\Delta(IZ-V)$ having a magnitude which is substantially equal to that portion of the magnitude of the input signal which exceeds a predetermined level. In the preferred embodiment this predetermined level is 0.25 per unit of rated volage.

The $I_{42}S$ signal, which was generated as described with respect to FIG. 3, is coupled to the input of a negative sequence reach adjust circuit 102 and the input of a first fixed reach circuit 104. In the preferred embodiment, the negative sequence reach adjust circuit 102 is an operational amplifier circuit with adjustable gain. The first fixed reach circuit 104 is preferably a fixed gain equivalent to a reach of 6 ohms on a 5A rated relay. The output of the negative sequence reach adjust circuit 102, which has a magnitude determined by the desired reach of the protective relay, is coupled to the input of a fifth AC couple circuit 106. The fifth AC couple circuit 106 is of the same type as the previously described first AC couple circuit 36.

The output of the fifth AC couple circuit 106, which is the same as the input except that any DC component has been removed, is coupled to an input of a fourth two-input summing amplifier 108. In the preferred embodiment, the fourth two-input summing amplifier 108 is an operational amplifier which generates an output signal having magnitude which is equal to the algebraic sum of the magnitudes of the input signals. The output of the first fixed reach circuit 104, which is proportional to a fixed reach of 6 ohms on a 5A rated relay, is coupled to the second input of the fourth two-input summing amplifier 108. The output of the fourth two-input summing amplifier 108 is coupled to the input of a sixth AC couple circuit 110. The sixth AC couple circuit 110 is of the same type as the previously described first AC couple circuit 36.

The output of the sixth AC couple circuit 110, which is the $I_2Z$ signal representative of the overreaching zone with any DC component removed, is coupled to the input of a fourth electronic switch 112 and a non-inverting input of a fifth two-input summing amplifier 114. The third electronic switch 112 is of the same type as the previously described second electronic switch 72 in that a "low" signal applied to the control input will cause the signal appearing at the switch input to be connected to the switch output. The output of the third electronic switch 112 is connected to the input of a third band pass filter 116. In the preferred embodiment, the third band pass filter 116 is the same type as the previously described second band pass filter 90, having a Q substantially equal to 3.8, a gain of one and a center frequency which is equal to the rated frequency of the power system; that is, 50Hz or 60Hz.

The output of the third band pass filter 116 is coupled to the inverting input of the fifth two-input summing amplifier 114. In the preferred embodiment, the output signal $I_2$ from the fifth two-input summing amplifier 114 is a signal whose magnitude is equal to the algebraic sum of the magnitudes of the signals applied to the inverting and non-inverting inputs. Due to the short term memory of the third band pass filter 116, the output signal $\Delta I_2$ from the amplifier 114, immediately following occurrence of a fault, is initially equal to the postfault negative sequence component of the current minus the prefault negative sequence component of the current; or that portion of the negative sequence component current which is attributable to the fault when the switch 112 is gated. When switch 112 is not gated, it is equal to the negative sequence component of the current. The signal $\Delta I_2$ is coupled to the input of a fifth absolute value circuit 118 which is the same type as the previously described first absolute value circuit 54. The output of the fifth absolute value circuit 118 is a signal $\Delta I_2$ whose magnitude is the absolute value of the magnitude of the input signal.

The $MI_0F$ signal, which was generated as described with respect to FIG. 3, is coupled to the input of a zero sequence reach adjust circuit 120 and the input of a second fixed reach circuit 122. In the preferred embodiment, the zero sequence reach adjust circuit 120 is an op amp with adjustable gain. The output of the zero sequence reach adjust circuit 120, which has a magnitude determined by the desired reach of the protective relay, is coupled to one input of a sixth two-input summing amplifier 124. The second fixed reach circuit 122 is the same type as the previously described first fixed reach circuit 104. The output of the second fixed reach circuit 122, which is also proportional to a reach of 6 ohms on a 5 amp rated relay, is coupled to the second input of the sixth two-input summing amplifier 124. In the preferred embodiment, the sixth two-input summing amplifier 124 is an operational amplifier which generates an output signal having a magnitude which is equal to the algebraic sum of the magnitudes of the signals applied at the inputs.

The output of the sixth two-input summing amplifier 124 is coupled to the input of a sixth AC couple circuit 126. The sixth AC couple circuit 126 is the same type as the previously described first AC couple circuit 36. The output of the sixth AC couple circuit 126, which is the $I_oZ$ signal representative of the overreaching zone with any DC component removed, is coupled to the input of a fourth electronic switch 128 and the non-inverting input of a seventh two-input summing amplifier 130. The fourth electronic switch 128 is the same type as the previously described second electronic switch 72 in that a "low" signal applied to the control signal input causes the signal appearing at the switch input to be connected to the switch output.

The output of the fourth electronic switch 128 is coupled to the input of a fourth band pass filter 132. The fourth band pass filter 132 is the same type as the previously described third band pass filter 116, having a Q preferrably equal to 3.8, a gain of one and a center frequency which is equal to the rated frequency of the power system; that is 50Hz or 60Hz. The output of the seventh two-input summing amplifier 132 is a signal having a magnitude which is the algebraic sum of the magnitudes of the signals applied to the inverting and non-inverting inputs of the amplifier 130. Due to the short term memory of the band pass filter 132, the output signal from the amplifier 130 is, immediately following the occurence of a fault, initially equal to the postfault zero sequence component of the current minus the prefault zero sequence component of the current; or the zero sequence component of the current which is attributable to the fault when switch 128 is gated. When switch 128 is not gated, it is equal to the zero sequence component of the current. The $\Delta I_0$ signal is coupled to the input of a sixth absolute value circuit 134 which is the same type as the previously described first absolute value circuit 54.

The output $\Delta I_0$ of the sixth absolute value circuit 134 which is the same type as the previously described absolute value circuit 54 is the absolute value of the input signal. A NOR signal, which is in a low state during the period that a pole is open on the transmission line, is coupled to the control inputs of the third 112 and fourth 128 electronic switches.

Figure 5:
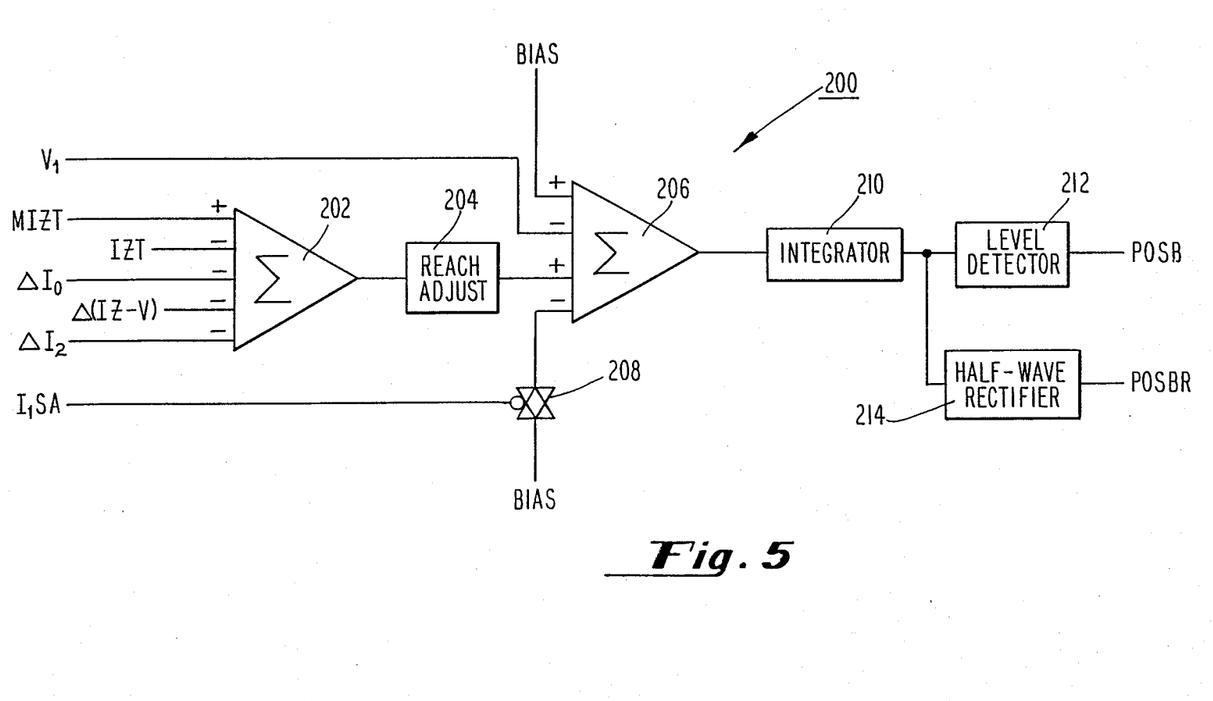
FIG. 5 is a block diagram of an out-of-step blocking circuit in accordance with a preferred embodiment of the present invention.

Referring now to FIG. 5, there is shown a block diagram of an out-of-step blocking circuit, generally designated 200. The MIZT signal, which was generated as described with respect to FIG. 4, is coupled to a non-inverting input of a five-input summing amplifier 202. In the preferred embodiment, the five-input summing amplifier 202 is an operational amplifier which produces an output signal having a magnitude which is equal to the algebraic sum of the magnitudes of the signals applied to its five-inputs. The IZT, $\Delta I_0$, $\Delta(IZ-V)$ and $\Delta I_2$ signals, which were generated as described with respect to FIG. 4, are each coupled to an inverting input of the five-input summing amplifier 202.

The output of the five-input summing amplifier 202 is coupled to the input of a reach adjust circuit 204. In the preferred embodiment, the reach adjust circuit 204 is an op amp with adjustable gain. The output of the reach adjust circuit 204, which has a gain selected to provide the desired reach for the out-of-step protection, is coupled to a non-inverting input of a four-input summing amplifier 206. In the preferred embodiment, the four-input summing amplifier 206 is an operational amplifier which produces an output signal having a magnitude which is equal to the albebraic sum of the magnitudes of the signals applied to the inverting and non-inverting inputs.

A first bias signal is applied to a non-inverting input of the four-input summing amplifier 206. The $V_1$ signal, which is generated as described with respect to FIG. 4, is coupled to an inverting input of the four-input summing amplifier 206. A second bias is coupled to an inverting input of the four-input summing amplifier 206 through a fifth electronic switch 208. The fifth electronic switch 208 is the same type as the previously described second electronic switch 72 in that a "low" signal applied to the signal control input causes the signal appearing at the switch input to be connected to the switch output.

The $I_1SA$ signal, which is generated as described with respect to FIG. 3, is coupled to the control input of the fifth electronic switch 208. The output of the four-input summing amplifier 206 is connected to the input of an "integrator" circuit 210. In the preferred embodiment, the "integrator" circuit 210 comprises an operational amplifier having a feedback circuit connected between its output and its input. The feedback circuit comprises a resistor and a capacitor connected in parallel. The input to the "integrator" circuit 210 is the input to the operational amplifier; and the output of the "integrator" circuit 210 is the output of the operational amplifier. The output of the integrator circuit 210 is coupled to the input of a second level detector 212 and the input of a half wave rectifier 214. The second level detector 212 is the same type as the previously described first level detector 88 and produces an output signal POSB when the magnitude of the input signal exceeds a predetermined level. In the preferred embodiment this predetermined level is approximately 30 mv to provide a threshold to overcome extraneous signals. The output POSBR of the half wave rectifier is the half wave rectified input signal which produces an output when the integrator 210 output is in the trip direction.

The out-of-step blocking unit of the present invention operates as follows. Assuming a normal situation where there are no faults or impedence swings, the $I_{42}S$, $MI_oF$, $\Delta I_2$ and $\Delta I_0$ signals will be essentially equal to zero because under normal load conditions the transmission system will produce only positive sequence quantities. The $\Delta(IZ-V)$ signal will be essentially equal to zero because there is no change in the positive sequence current or voltage during steady state load conditions. The $I_1SA$ signal will be a logic one if the load current is greater than the level detector sensitivity. The NOR signal is a logic one. The $V_1$ and $I_{41}S$ signals will be approximately 90° out of phase causing switch 70 to be off and switch 72 to be on for 90°. Thus the MIZT signal will be essentially equal to the IZT signal, and both will be proportional to the product of the load current and the relay reach. During normal load conditions, the output of integrator 210 will be in the restraint polarity and there will be no output at POSB or POSBR.

Assuming now a fault within the protected zone the $I_{42}S$, $MI_oF$, $\Delta I_2$, $\Delta I_0$, and $\Delta(IZ-V)$ signals assume values which are essentially established by the fault type and the fault location. The $I_1SA$ and NOR signals are both logic one. The $V_1$ and $I_{41}S$ signals will be approximately in phase thus switch 70 will be on and switch 72 will be off. Therefore, the restraint signal IZT will be nearly zero while the operate signal MIZT will proportional to the product of the fault current times the reach. The effects of the restraint signals $\Delta I_2$, $\Delta I_0$ and $\Delta(IZ-V)$ will be to slow or block the operation of the POSB unit thus ensuring coordination between the operation of POSB and the tripping elements of the protective scheme.

Assuming now there is an impedence swing which is not considered a fault, the system currents and voltages will be varying more slowly than during a fault condition and will be positive sequence quantities so that the $I_{42}S$, $MI_oF$, $\Delta I_2$, $\Delta I_0$ and $\Delta(IZ-V)$ signals will all be essentially equal to zero. In this condition the net input to the summing amp 206 due to MIZT and $V_1$ will be in the operate direction when the swing impedance enters the out-of-step blocking characteristic. The non-switched bias signal adds to the net operate ensuring that the out-of-step unit will have a larger operating signal magnitude than the associated tripping units. When the output of integrator 210 is of the tripping polarity, a signal is produced at POSBR which is used as a restraint signal in some of the associated tripping units. Thus the out-of-step blocking unit will always produce an output before the trip units on a swing condition.

The out-of-step blocking unit of the present invention has a number of advantages over the prior art out-of-step blocking units. Among these advantages are coordination of the out-of-step blocking unit and the tripping units on internal faults afforded by the addition of restraining signals to the out-of-step blocking unit. As described above, these added signals are $\Delta I_2$, $\Delta I_0$ and $\Delta(IZ-V)$ which prevent or substantially delay the operation of the out-of-step blocking unit on internal faults. This permits a substantially simplified application of the out-of-step blocking unit compared to the prior art designs.

As previously described, the $\Delta(IZ-V)$ signal is equal to the difference in the $(IZ-V)$ quantity between the fault and prefault values. The use of these additional restraint signals to prevent or substantially delay the operation of the out-of-step blocking unit on internal faults simplifies the application since the timer in the out-of-step blocking logic, which is traditionally the only setting that discriminates between a swing and a fault, may now be set without a rigorous determination of the impedence-time characteristic of the swing locus while assuring that the fastest swing will be detected. Consequently, not only does the out-of-step blocking unit of the present invention increase the reliability of the protective relay system, it also simplifies its application in the use enviroment.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of my invention.

What is claimed is:

1. An out-of-step blocking unit of a protective relay for detecting power swings in a three phase alternating current electrical power distribution system, said unit comprising:
   (a) means for receiving signals from a three phase power transmission line, which signals relate to the three phase voltages and currents;
   (b) means for utilizing said signals related to the three phase voltages and currents to generate at least one operate signal having a first polarity;
   (c) means for utilizing said signals related to the three phase voltages and currents to generate at least one restraint signal having a second polarity opposite said first polarity, said at least one restraint signal comprising a first restraint signal $\Delta(IZ-V)$, which signal is related to the difference between fault and prefault values of the $(IZ-V)$ quantity, where the signal IZ is related to the current I flowing in the power distribution system multiplied by a replica impedance Z of the protected zone and the signal V is related to a phase voltage of the electrical power distribution system; and (d) at least one summing circuit means, connected to receive said at least one operate signal and said at least one restraint signal, for producing a net operate signal having a polarity and a magnitude which is related to the vector sum of the magnitudes of said at least one operate signal and said at least one restraint signal.

2. The out-of-step blocking unit in accordance with claim 1 wherein said at least one restraint signal additionally comprises a second restraint signal $I_2$ related to a negative sequence component of current flowing in the power distribution system.

3. The out-of-step blocking unit in accordance with claim 2 wherein said second restraint signal is a signal $\Delta I_2$ which signal is related to the difference between the fault and prefault values of the $I_2$ quantity.

4. The out-of-step blocking unit in accordance with claim 3 wherein said at least one restraint signal additionally comprises a third restraint signal $I_0$ related to a zero sequence component of current flowing in the power distribution system.

5. The out-of-step blocking unit in accordance with claim 4 wherein said third restraint signal is a signal $\Delta I_0$ which is related to the difference between fault and prefault values of the $I_0$ quantity.

6. The out-of-step blocking unit in accordance with claim 5 wherein said means for generating at least one operate signal and said means for generating at least one restraint signal comprises:

(a) means for generating a signal $V_1$ related to a positive sequence component of a phase voltage;

(b) means for generating a signal $I_1Z$ comprising a signal $I_1$ related to a positive sequence component of a phase current multiplied by a quantity Z related to a predetermined portion of a replica impedance $Z_1$ of a first protected zone of said power transmission line;

(c) means for generating a polarizing signal $V_{pol}$ related to the difference between said $V_1$ and said $I_1Z$ signal;

(d) means for generating a signal $I_1Z_1$ comprising said $I_1$ signal multiplied by said replica impedance $Z_1$; and (e) means for comparing coincidence of $V_{pol}$ and $I_1Z_1$ and generating a first operate signal MIZT of said first polarity, said first operate signal related to said I signal multiplied by a quantity related to a replica impedance ZT of an overreach protected zone of said power transmission line, during coincidence of $V_{pol}$ and $I_1Z_1$, and generating a fourth restraint signal IZT of said second polarity, said fourth restraint signal related to said I signal multiplied by said overreach replica impedance ZT when $V_{pol}$ and $I_1Z_1$ are not coincident.

7. The out-of-step blocking unit in accordance with claim 6 additionally comprising a fifth restraint signal $V_1$ related to said positive sequence component of said phase voltage.

8. The out-of-step blocking unit in accordance with claim 7 additionally comprising means for generating a sixth restraint signal when the magnitude of a signal $I_1SA$, which is related to a positive sequence component of current flowing in the power distribution system, is less than a predetermined value.

9. An out-of-step blocking unit in accordance with claim additionally comprising energy comparison means adapted to receive said net operate signal, said energy comparison means comprising:

(a) integrator circuit means comprising an operational amplifier having an input adapted to receive said net operating signal, an output, and a feedback circuit connected between said input and said output, said feedback circuit comprising resistance means and capacitance means electrically connected in parallel; and (b) level detector means for generating an out-of-step blocking signal when the magnitude of an output signal from the output of said operational amplifier exceeds a predetermined level.

* * * * *